(12) United States Patent
Etzioni et al.

(10) Patent No.: US 7,249,643 B2
(45) Date of Patent: Jul. 31, 2007

(54) HUB MOTOR

(75) Inventors: Yoel Etzioni, Kibbutz Tzora (IL);
Philip Solomon, Kibbutz Tzora (IL);
Michael Glazman, Jerusalem (IL)

(73) Assignee: Tzora Active Systems Ltd., Kibbutz Tzora (IL)

( * ) Notice: Subject to any disclaimer, the term of this patent is extended or adjusted under 35 U.S.C. 154(b) by 362 days.

(21) Appl. No.: 10/444,478

(22) Filed: May 22, 2003

(65) Prior Publication Data

US 2003/0217878 A1    Nov. 27, 2003

(30) Foreign Application Priority Data

May 23, 2002    (IL) ..................... 149815

(51) Int. Cl.
*B60K 1/00*    (2006.01)
(52) U.S. Cl. ............. 180/65.5; 180/65.1; 180/220; 180/65.6
(58) Field of Classification Search ........ 180/65.5, 180/65.1, 65.6, 65.7, 65.8, 206, 65.3–8, 220; 301/36.1; 188/18 A, 72.4; 310/67 R
See application file for complete search history.

(56) References Cited

U.S. PATENT DOCUMENTS

| | | | |
|---|---|---|---|
| 2,039,513 A * | 5/1936 | Baker | 180/65.5 |
| 3,686,978 A * | 8/1972 | Knoblach et al. | 475/296 |
| 3,737,000 A * | 6/1973 | Knobloch et al. | 180/369 |
| 3,812,928 A * | 5/1974 | Rockwell et al. | 180/65.5 |
| 3,897,843 A * | 8/1975 | Hapeman et al. | 180/65.5 |
| 4,799,564 A * | 1/1989 | Iijima et al. | 180/65.5 |
| 4,895,052 A * | 1/1990 | Gleasman et al. | 475/7 |
| 4,913,258 A * | 4/1990 | Sakurai et al. | 180/242 |
| 5,236,055 A * | 8/1993 | Legal | 180/65.5 |
| 5,282,719 A * | 2/1994 | McCarty et al. | 416/1 |
| 5,341,892 A * | 8/1994 | Hirose et al. | 180/220 |
| 5,382,854 A * | 1/1995 | Kawamoto et al. | 310/67 R |
| 5,600,191 A * | 2/1997 | Yang | 310/67 R |
| 5,924,506 A * | 7/1999 | Perego | 180/65.5 |
| 6,321,863 B1 * | 11/2001 | Vanjani | 180/65.5 |
| 6,328,123 B1 * | 12/2001 | Niemann et al. | 180/65.5 |
| 6,390,216 B1 * | 5/2002 | Sueshige et al. | 180/65.5 |
| 6,530,859 B2 * | 3/2003 | Boston et al. | 475/331 |
| 6,651,762 B1 * | 11/2003 | Hokanson et al. | 180/65.5 |

* cited by examiner

*Primary Examiner*—Christopher P. Ellis
*Assistant Examiner*—Vaughn Coolman
(74) *Attorney, Agent, or Firm*—Ladas & Parry, LLP

(57) ABSTRACT

The invention provides a hub motor for a wheeled conveyance having a stationary electric motor encased in a rotating, multi-part housing, at least one of the parts of the housing constituting a wheel disk and a wheel rim, and a reduction gear internal or external to the motor, the output member of which is adapted to drive at least one part of the multi-part housing, wherein the rim portion of the multi-part housing carries, and is in direct contact with, a wheel tire.

5 Claims, 6 Drawing Sheets

Fig.2.
Fig.3.
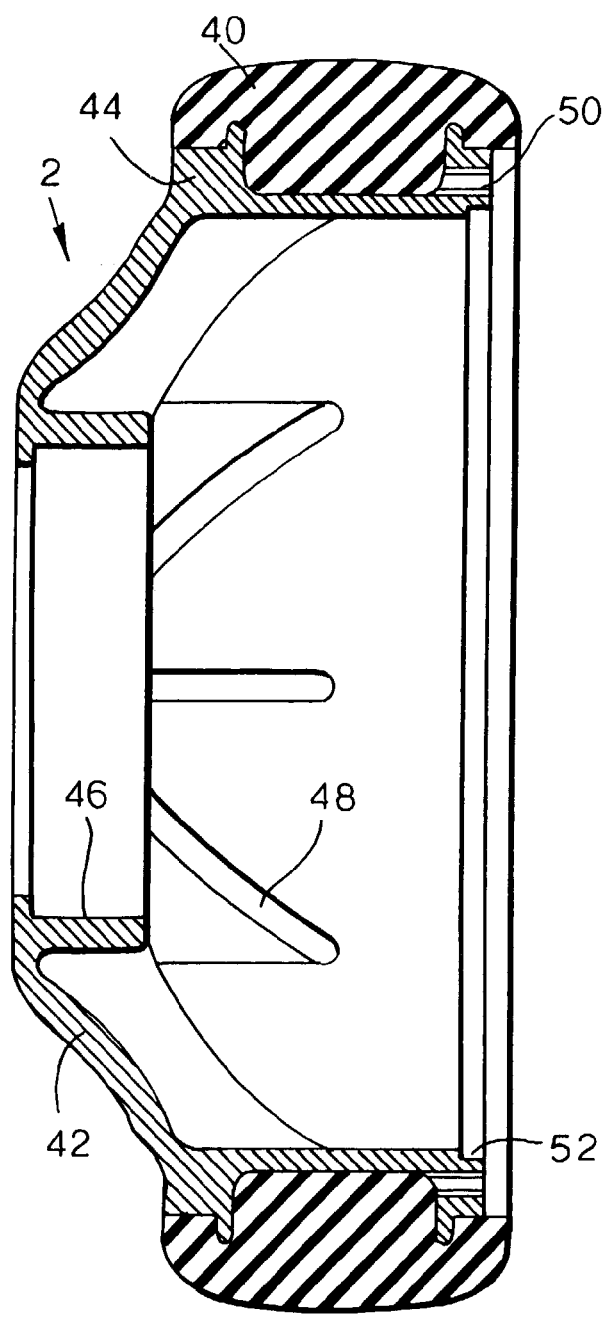
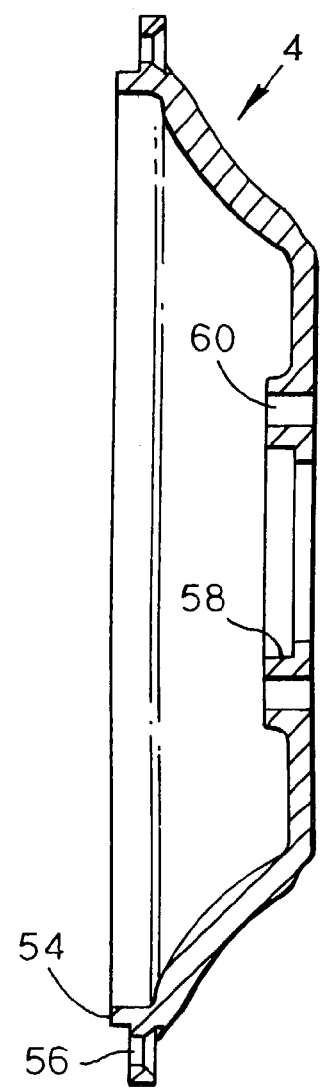

HUB MOTOR

FIELD OF THE INVENTION

The present invention relates to a hub motor for a wheeled conveyance.

BACKGROUND OF THE INVENTION

Hub motors, per se, are known. Certain types of bicycles are equipped with hub motors that carry, via spokes, a wheel rim in which a tire is seated. These motors, however, are not reversible, nor are they provided with a brake. Some wheelchairs, on the other hand, do have reversible, braked hub motors that are connected, again via spokes, to a wheel rim provided with a tire.

DISCLOSURE OF THE INVENTION

It is thus one of the objects of the present invention to provide a hub motor having a housing that constitutes both a wheel disk and a wheel rim carrying a tire.

According to the invention, the above object is achieved by providing a hub motor for a wheeled conveyance, comprising a stationary electric motor encased in a rotating, multi-part housing, at least one of the parts of the housing constituting a wheel disk and a wheel rim, and a reduction gear internal or external to the motor, the output member of which is adapted to drive at least one part of the multi-part housing; wherein the rim portion of the multi-part housing carries, and is in direct contact with, a wheel tire.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a partial cross-sectional view of the hub motor assembly according to the present invention;

FIG. 2 is a cross-sectional view of a first part of the split housing of the motor;

FIG. 3 is a similar view of the second part of the split housing;

FIG. 4 is a cross-sectional view of the solenoid brake of the hub motor;

FIG. 5 represents a partial top view of the solenoid brake of FIG. 4;

FIG. 6 is a front view of the solenoid brake enclosure;

FIG. 7 is an elevational view of the bearing enclosure, seen from its inside;

FIG. 8 is a cross-sectional view along plane VIII-VIII of FIG. 7;

FIG. 9 illustrates the way the hub motor is attachable to a member of a conveyance;

FIG. 10 is a side view of the arrangement according to FIG. 9, and

FIG. 11 is a block diagram of the electric and electronic systems associated with the hub motor according to the present invention.

DETAILED DESCRIPTION

Figure 1:
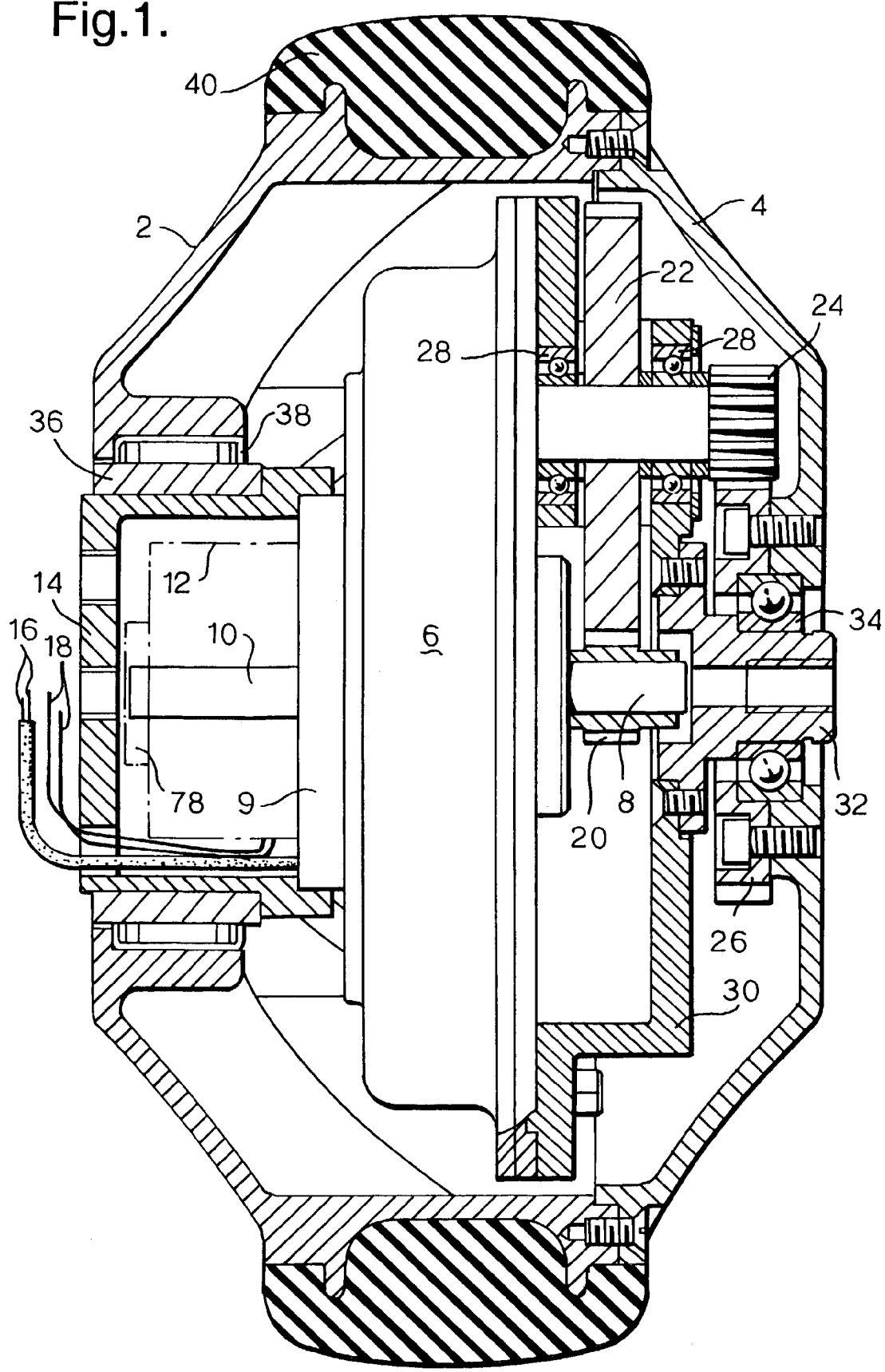

Referring now to the drawings, FIG. 1 illustrates, encased in a multi-part or split housing 2, 4, an electric motor 6, in this particular embodiment a DC, permanent magnet, flat motor of the type ZYP-6N, having an output shaft 8 extending beyond an end plate 9 to the other side of the motor as brake shaft 10. Brake shaft 10 is designed to be acted upon by a solenoid brake 12, represented in detail in FIGS. 4 and 5. Also shown is brake enclosure 14, fixedly attached to motor 6 by means of screws (not shown), and seen to better advantage in FIG. 6. Shown emerging from stationary brake enclosure 14 are two pairs of cables: a first pair 16 supplying motor 6, and a second pair 18 controlling solenoid brake 12.

Fixedly attached to output shaft 8 is the first pinion 20 of a reduction gearing comprising a gear 22 meshing with pinion 20, to which gear 22 is keyed a second pinion 24 for driving output gear 26, fixedly attached to, and thus driving, housing part 4. While the above-described reduction gearing is clearly external to motor 6, it is also possible to use a gear motor in which the reduction gearing is internal.

Figure 7:
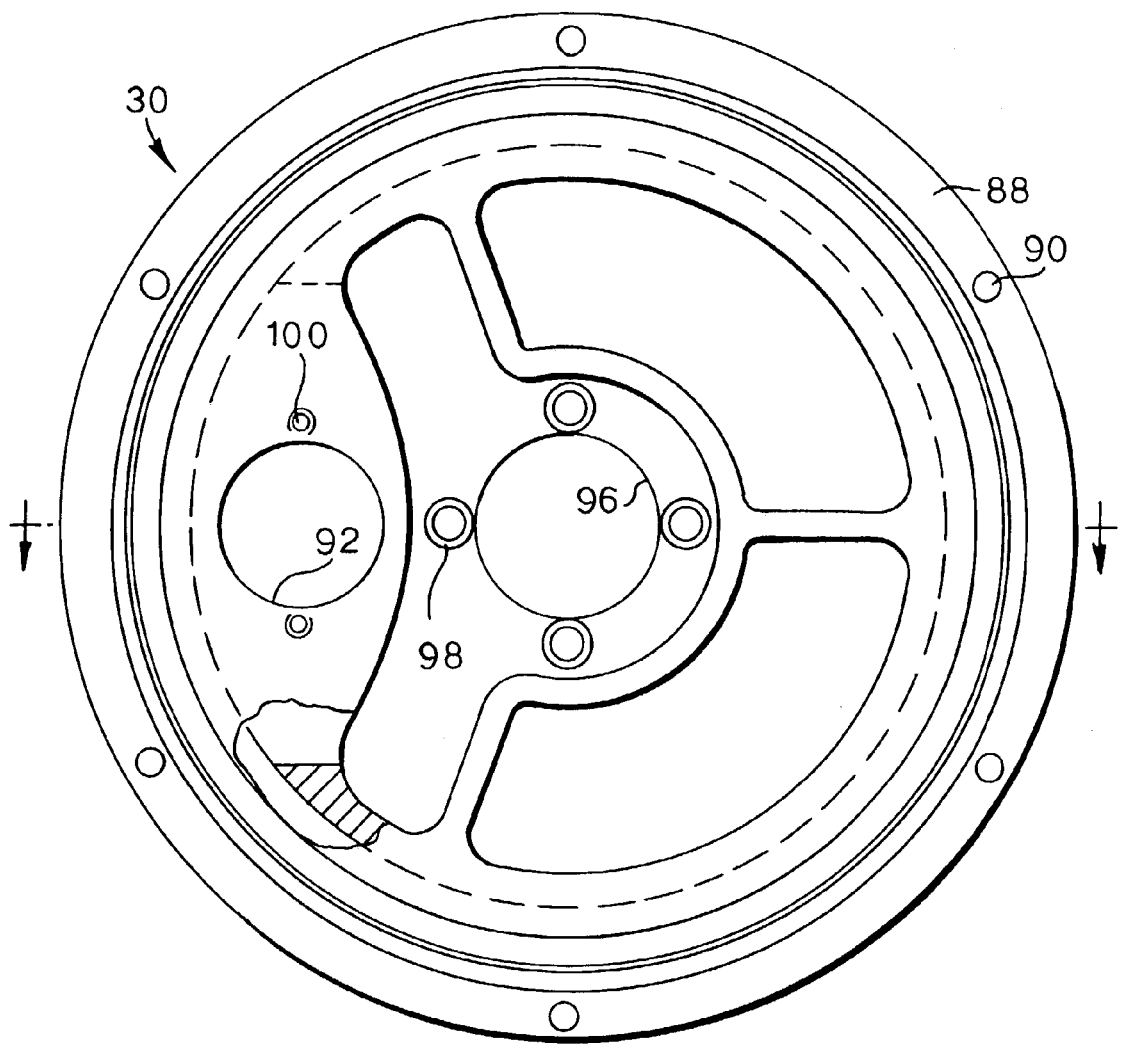
Figure 8:
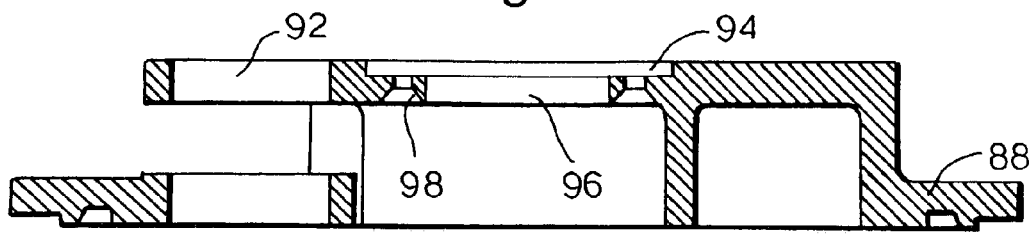

Second pinion 24 is mounted in ball bearings 28 accommodated in bearing enclosure 30 (FIGS. 7 and 8). Fixedly attached to bearing enclosure 30 is stub axle 32, mounting a ball bearing 34. Housing part 4 is seated on the outer race of ball bearing 34. Brake enclosure 14 acts as a counter-stub axle on the other side of motor 6, carrying the inner race 36 of a needle bearing, the outer race 38 of which is press-fitted into housing part 2.

Also seen in FIG. 1 is tire 40, seated on and retained by housing part 2. The surface of tire 40 is provided with appropriate grooving to ensure traction. While tire 40 is shown as a solid tire, a slight modification of housing half 2 will permit the use of an inflatable tire.

FIG. 2 shows housing part 2, constituting both wheel disk 42 and wheel rim 44, with the tire 40 ghosted in. Also shown is the shouldered seat 46 of the outer race 38 of the needle bearing (FIG. 1). Housing part 2 is reinforced by a number of ribs 48. Peripheral threaded holes 50 and step 52 serve for the attachment of housing part 4.

Housing part 4 is illustrated in FIG. 3. Shown are neck portion 54, fitting step 52 of housing part 2; peripheral, counter-sunk holes 56 registering with threaded holes 50 of housing part 2; a seat 58 for ball bearing 34 (FIG. 1), and threaded holes 60 for the attachment of gear 26.

Figure 4:
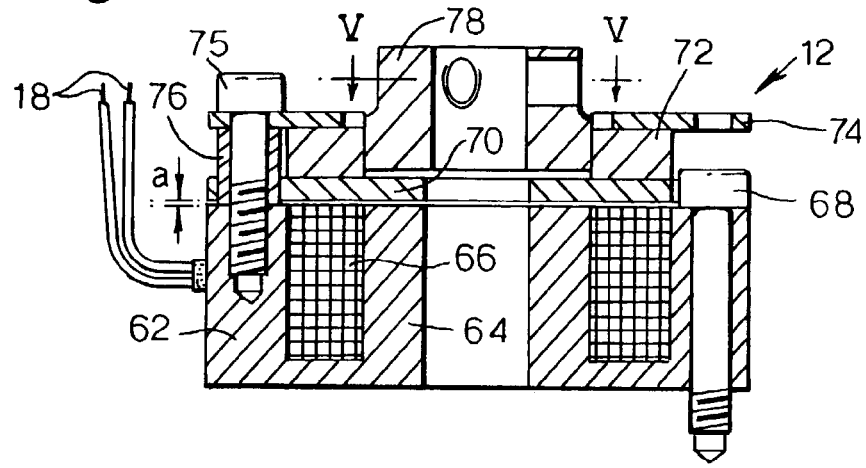
Figure 5:
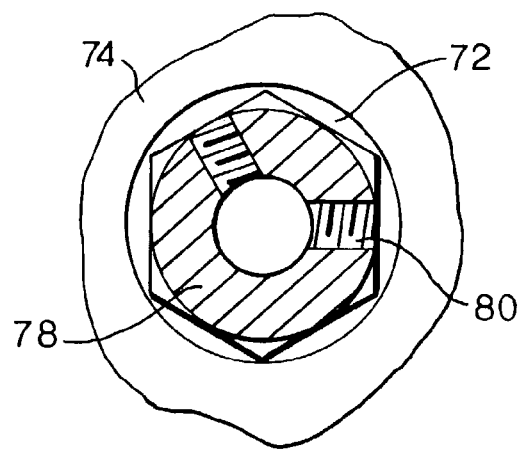

Solenoid brake 12 is illustrated in FIGS. 4 and 5. Shown is ferromagnetic solenoid body 62 with its core 64, and solenoid coil 66, located in the annular space between them. The two ends 18 of coil 66 lead to the outside. Body 62 is fixedly attached to motor 6 by screws 68. The ferromagnetic solenoid armature 70 is disposed above the coplanar faces of solenoid body 62 and core 64 and is biased by spring means (not shown) away from those faces, thus producing an air gap a of a few tenths of a millimeter.

The above-mentioned spring means could be a number of helical compression springs inserted into peripheral holes in solenoid body 62 and in the free state, projecting above the face of solenoid body 62. Clearly, this solenoid is of the normally open type.

Further shown is a brake disk 72, located between armature 70 and a counter-disk 74 firmly attached to solenoid body 62 by means of screws 75, at a distance determined by three distance sleeves 76. Brake disk 72 has a hexagonal central opening, into which the lower, hexagonal portion of end piece 78 fits. End piece 78 is fixedly connected to brake shaft 10 (FIG. 1) by means of two grub screws fitting threaded holes 80.

The braking position shown in FIG. 4 is attained by cutting off the current to normally open solenoid brake 12. In a braking episode, this is done simultaneously with cutting the current supply to motor 6. As a result, brake disk 70 becomes clamped between counter-disk 74 and armature 70 by the biasing force exerted on the armature by the above-mentioned spring means, and is then driven against the frictional force by the hexagonal portion of end piece 78 until the remaining kinetic energy of the conveyance is totally converted into heat. To release the brake, the solenoid is activated pulling down armature 70 against the biasing spring means and thereby unclamping brake disk 72, allowing it and end piece 78, and thus shaft 10, to freely rotate.

Figure 6:
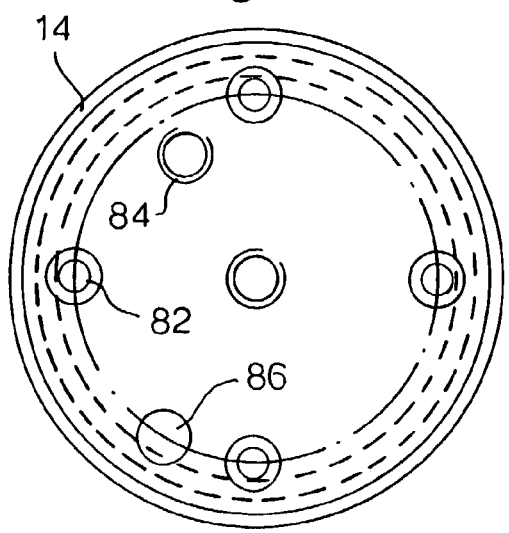

A front view of brake enclosure 14 is shown in FIG. 6. Seen are four countersunk holes 82 for screws, whereby brake enclosure 14 is attached to end plate 9 (FIG. 1); two threaded holes 84 for connection to a bracket 106 (FIG. 10), whereby the motor/wheel unit is attached, e.g., to the steering column of a conveyance; and one hole 86, through which cable pairs 16 and 18 (FIG. 1) are led to the outside. In FIG. 1, hole 86 and hole 84 have been swung into a vertical plane for purposes of clarity.

FIG. 7 represents a view of bearing enclosure 30, seen from the side where it is attached to motor 6, and FIG. 8 is a cross-sectional view along plane VIII-VIII of FIG. 7. Shown are flange 88 with peripheral holes 90 for connection to motor 6, and two spaced-apart bores 92 for accommodating the ball bearings 28 that mount pinion 24. Further provided are a cylindrical recess 94 and a bore 96 for accommodating stub axle 32, as well as four countersunk holes 98 for the screws mounting the stub axle on the structure. Two threaded holes 100 serve to attach a retaining ring for the front ball bearing 28.

Figure 10:
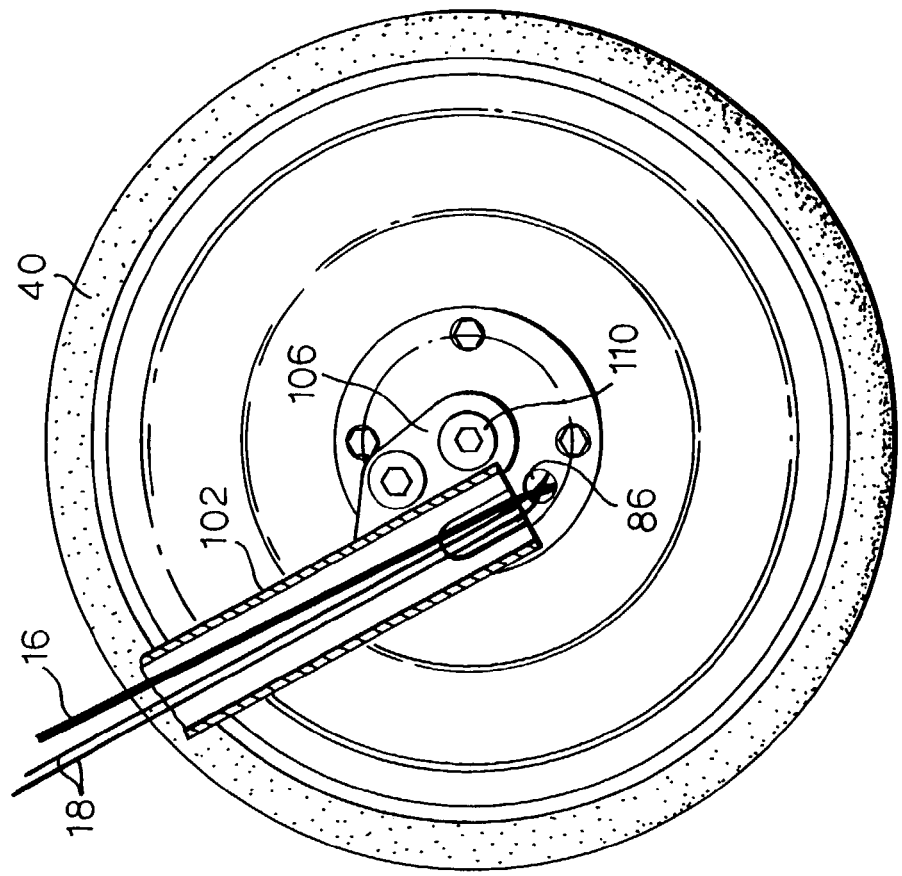
Figure 9:
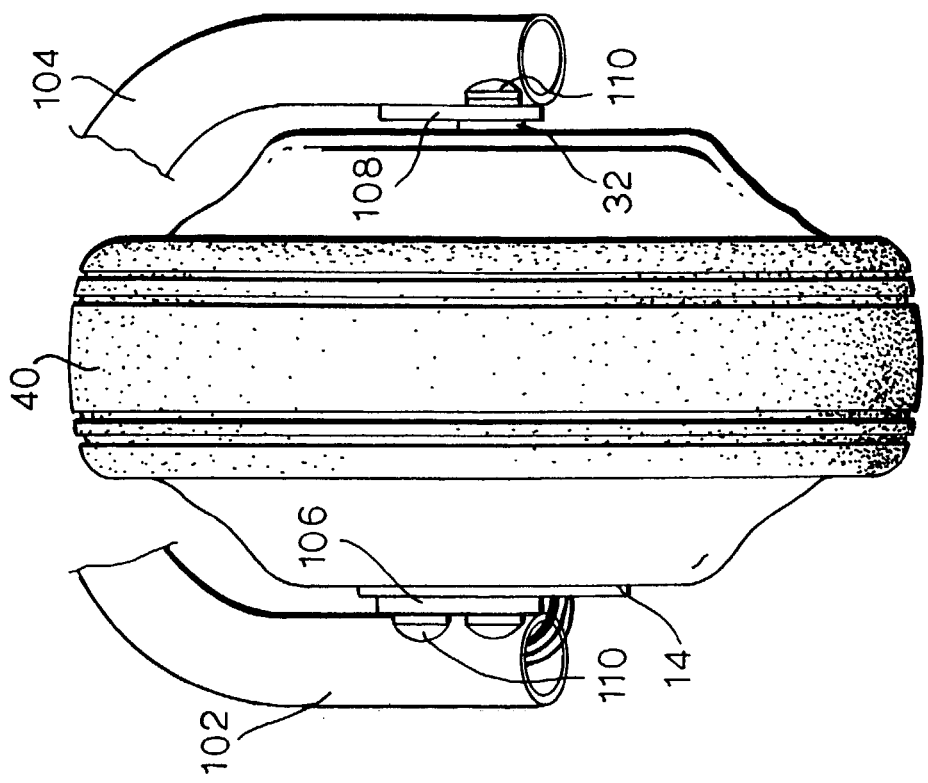

FIGS. 9 and 10 illustrate the way in which the hub motor according to the present invention is attached to a member of the conveyance, e.g., the forked ends 102, 104 of a tubular steering column. The hub motor is connected to ends 102, 104 by means of brackets 106, 108 welded to ends 102, 104, respectively. Bracket 106 is attached to brake enclosure 14 by means of two screws 110 fitting threaded holes 84 (FIG. 6), and bracket 108 is mounted on the end face of stub axle 32 by means of another screw 110 fitting the internal thread of the stub axle end. Cables 16, 18 are led through tubular end 102, as seen in FIG. 10.

Figure 11:
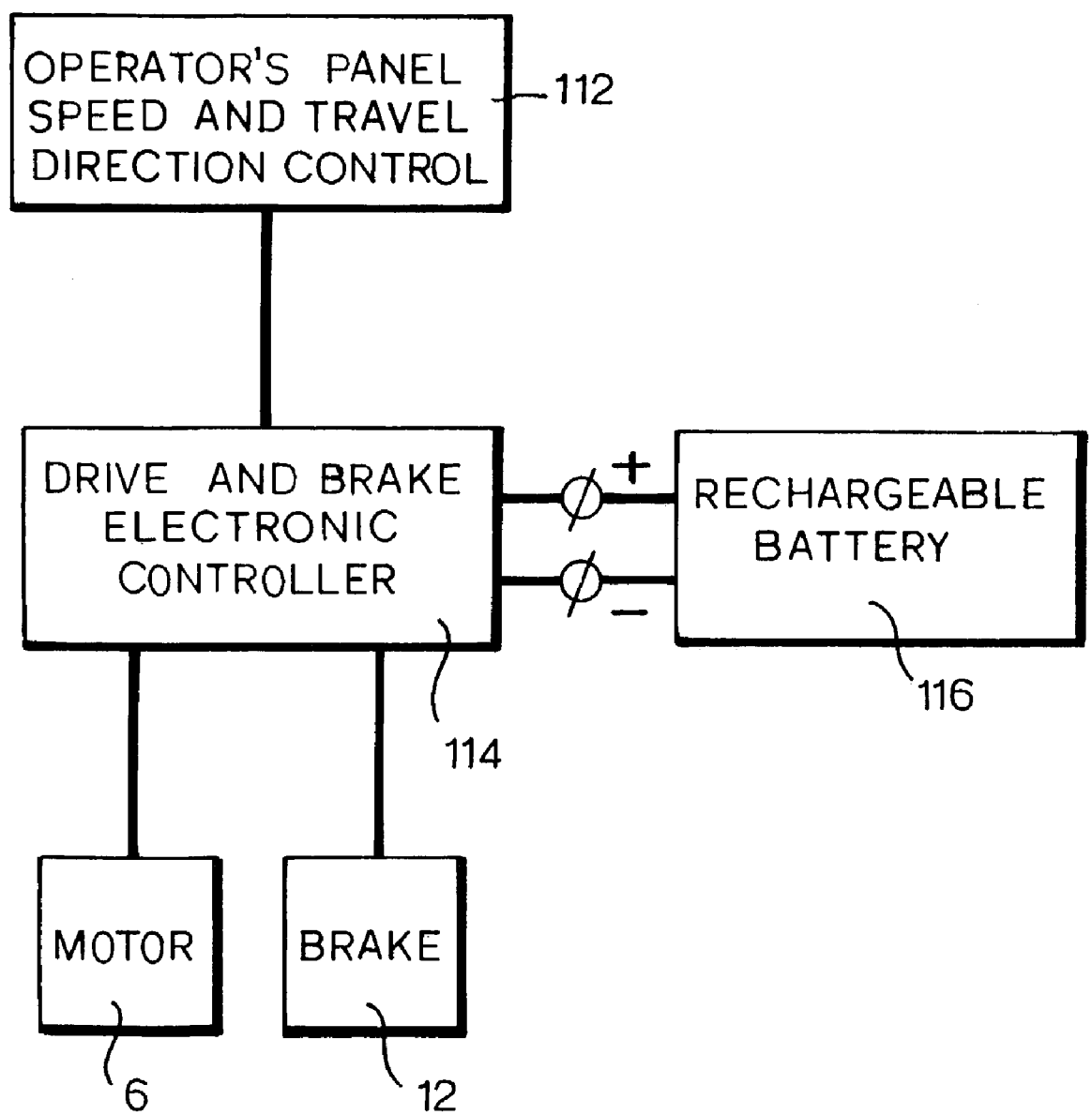

The block diagram of FIG. 11 comprises an operator's panel 112 for speed and direction control, an electronic drive and brake controller 114, and a rechargeable battery 116. Provision is also made for a free-wheeling switch that permits the release of solenoid brake 12 without activating motor 6.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hub motor for a wheeled conveyance, comprising:
   a stationary electric motor encased in a rotating, multi-part housing, at least one of the parts of said housing constituting a wheel disk and a wheel rim; and
   a reduction gear in the form of a non-planetary gear train, the output member of which is adapted to drive at least one part of said multi-part housing;
   the rim portion of said multi-part housing carrying, and being in direct contact with, a wheel tire; and
   a brake means, wherein said brake means is a solenoid brake located on the part of said housing opposite to the part accommodating said output member, said brake being adapted to act on a shaft of said motor.

2. The hub motor as claimed in claim 1, wherein said reduction gear is constituted by a multi-gear train, the first member of which is mounted on the output shaft of said motor and the last member of which drives a gear attached to, or integral with, one part of said multi-part housing.

3. The hub motor as claimed in claim 1, wherein said motor is reversible.

4. The hub motor as claimed in claim 1, further comprising means for attachment to, and support by, a member of said conveyance, said means being two brackets mountable on an enclosure of said motor and on a stub axle of said multi-part housing, respectively.

5. The hub motor as claimed in claim 1, wherein the brake means is provided to reduce the kinetic energy of the conveyance until the remaining kinetic energy of the conveyance is totally converted to heat.

* * * * *